March 19, 1963
J. W. PICKRELL
3,081,590
FRONTAL MEANS FOR COTTON PICKING MACHINES
Filed Jan. 27, 1961
3 Sheets-Sheet 2
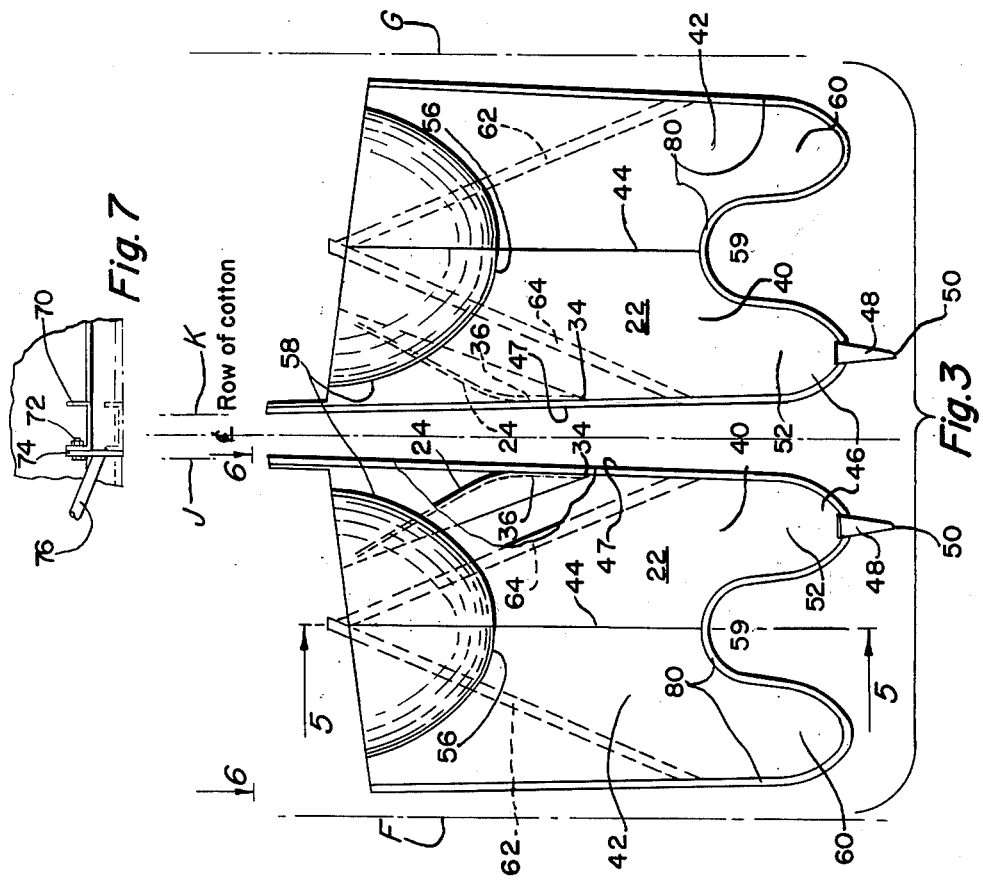
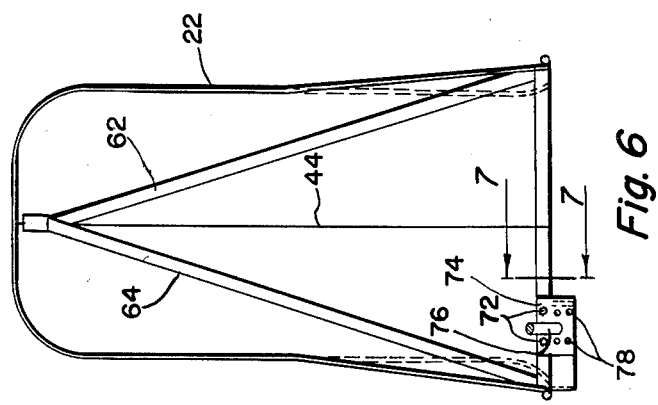
INVENTOR.
John W. Pickrell.

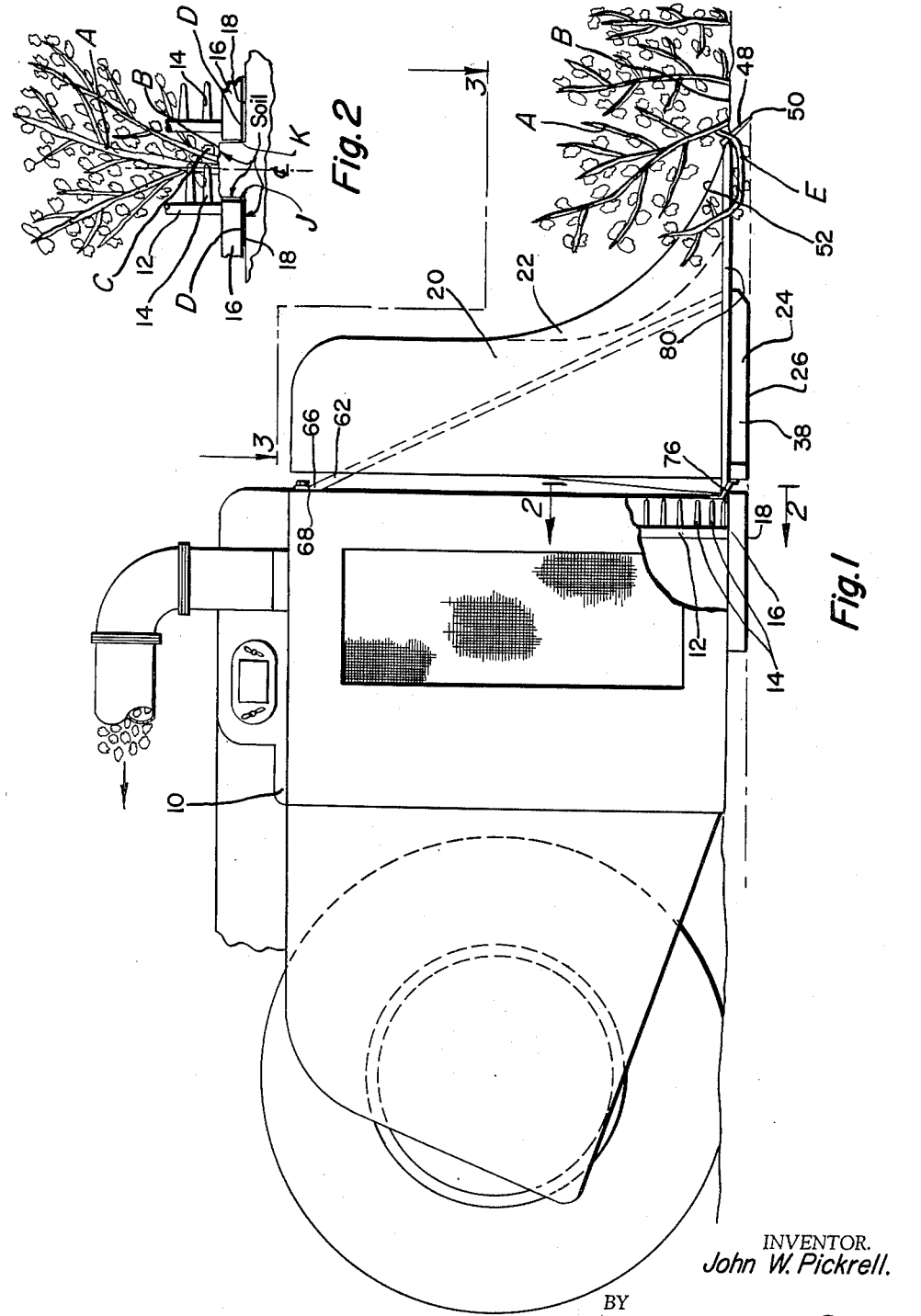

March 19, 1963 J. W. PICKRELL 3,081,590
FRONTAL MEANS FOR COTTON PICKING MACHINES
Filed Jan. 27, 1961 3 Sheets-Sheet 3
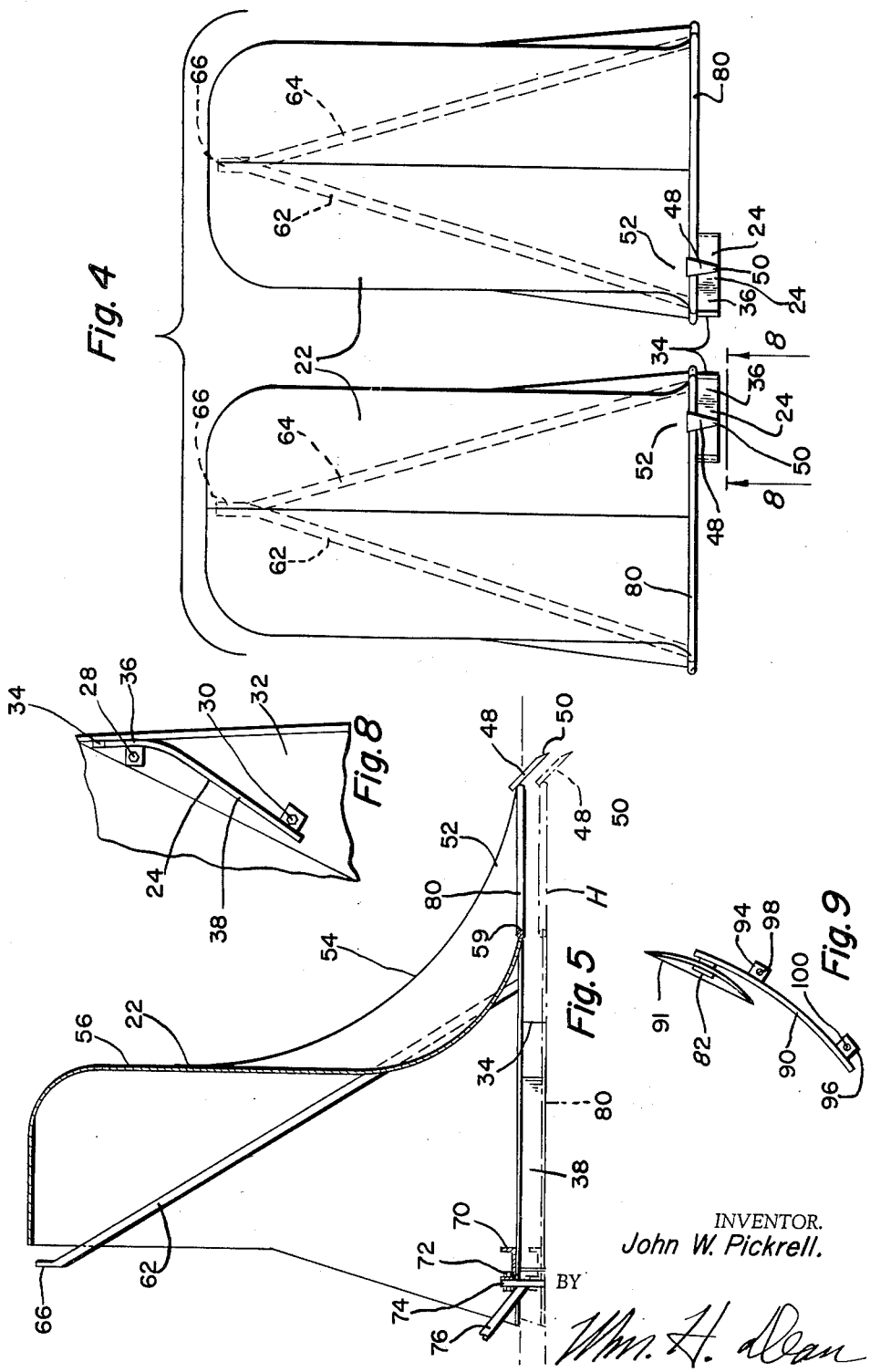
INVENTOR.
John W. Pickrell.
BY
Wm. H. Dean United States Patent Office 3,081,590
Patented Mar. 19, 1963

3,081,590
FRONTAL MEANS FOR COTTON
PICKING MACHINES
John W. Pickrell, 829 W. Hollyhock, Scottsdale, Ariz.
Filed Jan. 27, 1961, Ser. No. 85,274
7 Claims. (Cl. 56—11)

This invention relates to a frontal means for cotton picking machines and more particularly to a frontal means for cotton picking machines which is provided with means disposed to remove the soil at opposite sides of a row of cotton plants whereby the bar bearing supporting shoes or the bottom frame of a cotton picking machine may be lowered in order to permit the spindles of the bars to gather cotton very close to the upper surface of the ground and around the lower portions of the cotton plants.

Conventional cotton picking machines employ bars having vertical axes and horizontally extending spindles which gather cotton from cotton plants while the machine moves longitudinally of the rows of such plants. The vertically disposed bars are supported at their lower ends by bearings which are fixed in conventional bearing shoes or frame structure whereby the horizontally extending spindles of the bars are normally disposed a considerable distance above the upper surface of the ground due to the fact that the lower surface of the bearing supporting shoes or frame cannot usually be lowered below the surface of the ground adjacent to the cotton plants.

Such conventional cotton picking machines are therefore limited to operation of their spindles at an elevation several inches above the surface of the ground, and for this reason, fail to gather the bolls of cotton which are very close to the surface of the ground, or lying thereon. This condition is very important with respect to overall yield when cotton plants have cotton bolls very close to the surface of the ground.

Additionally, conventional cotton picking machines are difficult to control because the operator can not visually maintain the machine very close to the upper surface of the ground. Consequently, the spindles of the machine cannot be operated at an optimum level.

Accordingly, it is an object of the invention to provide a frontal means for cotton picking machines which permits the spindles of the machine to gather cotton right down to the upper surface of the ground from which the stocks of the cotton plants project.

Another object of the invention is to provide a frontal means for cotton picking machines having blades adapted to operate ahead of the picking spindles of the machine whereby these blades displace soil at opposite sides of a row of cotton plants so that the bar bearing shoes or frame of the machine may be lowered to run in areas displaced by said blades so that the spindles may engage cotton bolls down to and including those resting on the surface of the ground.

Another object of the invention is to provide a frontal means for cotton picking machines which greatly facilitates the accurate control of a cotton picking machine so that it may be operated precisely at an optimum level with respect to the upper surface of the ground.

Another object of the invention is to provide a frontal means for cotton picking machines which is extended sufficiently at the front of the machine so that the operator may readily see the elevation of lifters, or shields thereof, to indicate a vertical position at which the machine should be operated.

Another object of the invention is to provide a frontal means for cotton picking machines which greatly improves accuracy of the operator in following and picking a row of cotton.

Another object of the invention is to provide a frontal means for cotton picking machines which may readily and easily be attached to conventional cotton picking machines.

Another object of the invention is to provide a frontal means for cotton picking machines which comprises shields which follow opposite sides of rows of cotton and which are contoured so that the cotton plants are very gently forced into a confined space ahead of the spindles of a cotton picking machine thereby causing a minimum of damage to the plants during the first picking and a minimum disturbance and loss of cotton bolls during all the picking operations.

Another object of the invention is to provide a frontal means for cotton picking machines having spaced plant guiding shields disposed to straddle rows of cotton; said shields closer together at their lower portions than at their upper portions, whereby the shields closely conform to and guide the normally upward diverging plant limbs.

Another object of the invention is to provide a frontal means for cotton picking machines which moves the soil away from opposite sides of a row of cotton plants during the first picking to permit lowering of the picking spindles while at the same time the blades also remove trash and or weeds from the area to be covered by the spindles so that the overall load of cotton gathered contains a minimum of foreign matter.

Another object of the invention is to provide a frontal means for cotton picking machines having plant engaging shields carrying trowels thereunder so that soil may be troweled away from opposite sides of a row of cotton plants during the first picking and whereby during the second picking, the trowels may be removed and the shields may be lowered to a level at which the earth was previously troweled away when the trowels were in position below the shields.

An additional object of the invention is to provide a frontal means for cotton picking machines which generally improves the performance and picking economy of a cotton picking machine and which is very simple and economical of construction, durable, and easy to install and maintain on a conventional cotton picking machine.

Further objects and advantages of the invention may be apparent from the following specification, appended claims, and accompanying drawings, in which:

FIG. 1 is a fragmentary side elevational view of a conventional cotton picking machine showing portions thereof broken away to amplify the illustration and showing the frontal means for cotton picking machines of the present invention in connection with the cotton picking machine;

FIG. 2 is a fragmentary sectional view taken from the line 2—2 of FIG. 1, showing a row of cotton plants at opposite sides of which the soil has been troweled away to permit the bearing shoes of the cotton picking machine to be lowered so that spindles of the machine may operate at ground level about the stocks of the cotton plants;

FIG. 3 is a plan view of the frontal means for cotton picking machines in accordance with the invention, taken from the line 3—3 of FIG. 1;

FIG. 4 is a front elevational view of the frontal means for cotton picking machines in accordance with the present invention;

FIG. 5 is a sectional view taken from the line 5—5 of FIG. 3;

FIG. 6 is a rear elevational view of one shield of the frontal means for cotton picking machines in accordance with the invention taken from the line 6—6 of FIG. 3;

FIG. 7 is a fragmentary sectional view taken from the line 7—7 of FIG. 6;

FIG. 8 is a slightly enlarged fragmentary bottom plan view taken from the line 8—8 of FIG. 4, showing the general shape of one of the soil trowels or blades which operates to trowel or move soil away from each side of a row of cotton plants in accordance with the invention; and FIG. 9 is a view similar to FIG. 8, showing a modification of the soil moving blade structure disclosed therein.

As shown in FIG. 1 of the drawings, a conventional cotton picking machine 10 is provided with conventional vertical bars 12 having horizontally disposed cotton picking spindles 14. The lower ends of the bars are rotatably mounted in bearings carried by a conventional bearing shoe 16. It will be appreciated that these bars 12, having the horizontally projecting spindles rotate about vertical axes and that the lower ends of these bars require bearings which are carried in the shoes or frame. Consequently, the lowermost spindles 14 are normally held several inches above the lower surface 18 of the bearing means or shoes 16 or the lower surface of the machine frame. Consequently, in accordance with conventional practice, the spindles 14 are a considerable distance above the upper surface of the ground when the bottom portion 18 of the bearing shoes 16 or the lower portion of the frame operates at the upper surface of the ground. This is a conventional manner of operating a cotton picking machine. It will be appreciated by those skilled in the art that when the lowermost spindles 14 are a considerable distance above the ground level, that the spindles do not engage cotton bolls lying on the ground or connected to limbs lying on the ground and therefore much cotton is missed by the machine. Actually, this situation becomes more critical in relation to small plants or plants which have a substantial percentage of their limbs and bolls barely above the ground surface.

If the conventional cotton picking machines are operated in a manner to run the bearing shoes 16 or frame very close to the surface of the ground, they may cause a considerable amount of weeds and or trash to be picked up and carried into the cotton picker thereby raising the cost of ginning the cotton.

According to the present invention, a frontal means 20 comprises shields 22 which are disposed on opposite sides of rows of cotton plants during the picking operation. Secured to the lowermost portions of these shields are blades 24 which have lower edges or portions 26 fixed at a plane coinciding with the lower surface 18 of the bearing shoes 16 of the cotton picking machine. These blades 24 thus move the soil away from opposite sides of a row of cotton, as shown best in FIG. 2 of the drawings. From FIG. 2 of the drawings, it will be seen that the row of cotton plants A projects from the upper surface B of the soil and that many bolls C of cotton may be lying at the surface B on the ground. The blades 24 move the soil away down to a level D at opposite sides of the row of cotton plants A so that the bearing shoe 16 may run in the areas D, thereby permitting the spindles 14 of the bars 12 to gather cotton in close proximity to, or that which rests on the upper surface B of the soil surrounding the stocks on the cotton plants.

The blades 24 are fixed to lower portions of the shields 22, as shown best in FIGS. 4 and 8 of the drawings.

Each blade 24 is secured to the bottom of a respective shield 22 by means of bolts 28 and 30 fixed to a frame plate 32 of the respective shield.

Each blade 24 is operable at one side of a row of cotton, as shown in FIG. 2 of the drawings, to provide a troweled recess D, as hereinbefore described. Thus, these blades 24, as shown in FIG. 3, are disposed in spaced relationship to each other and connected to respective shields 22 and diverge rearwardly toward the cotton picking machine 10. The rearward diverging relationship of each pair of blades 24 is provided for by an angular geometry of each individual blade 24, shown in FIG. 8 of the drawings. This blade 24 is provided with a forward or leading edge 34 which precedes a short straight section 36 operable in a substantially parallel relationship to the center line of the row of cotton, as illustrated in FIG. 3 of the drawings. Extending backwardly from this short straight section 36, is an angularly disposed section 38, which when in operation, extends backwardly and away from the center line of the row of cotton, as shown in FIG. 3 of the drawings, so that the leading edge 34 of each trowel blade 24 shears the soil preliminary to its lateral displacement by the angularly disposed portion 38 of each blade 24. Thus, the soil is moved laterally away from the center line of each row of cotton to provide the soil recesses D longitudinally of and parallel with the center line of each row of cotton.

As the leading edge 34 of each blade 24 moves forward through the soil, it separates the trash, including clods, dry limbs, weeds, pods, and other foreign matter and moves such foreign matter away from the area in which the fingers 14 of the spindles 12 are disposed to gather cotton when the machine 10 is operated longitudinally of the rows A, as shown in FIG. 2 of the drawings.

The shields 22, which carry the blades 24, operate in pairs, as shown in FIGS. 3 and 4 of the drawings, to straddle each row of cotton, as illustrated in FIG. 2 of the drawings, and these shields may be installed on cotton picking machines equipped to pick a plurality of rows at one time, as will be hereinafter described. The shields 22 may be made of any suitable material such as a composite resin and fiber glass construction or sheet metal such as disclosed in the preferred embodiment of the invention. Each shield 22 comprises a pair of sections 40 and 42 which are secured together by overlapping portions 44 which may be bolted, spot welded, or otherwise fixed together. Each section 40 has a forwardly extending toe 46 which carries a lifter tooth 48. These lifter teeth 48, as shown in FIGS. 1 and 5 of the drawings, are provided with forwardly and downwardly extending ends 50 which project below the surface of the soil and raise limbs E, as shown in FIG. 1 of the drawings, whereby the limbs which lie down on the ground are picked up and directed over gently curved inclined portions 52 of the toes 46.

The toes 46 are disposed to operate in adjacent spaced relationship to each other on opposite sides of the center line of a row of cotton and these inclined portions 52 are extended a considerable distance forwardly of the machine 10 so that the operator may readily see the projection of the lifters 48 into the ground and may thereby accurately operate the blades 24 to perform, as disclosed in FIG. 2 of the drawings and hereinbefore described. Further, it will be appreciated that the toes 46 of the shield 22 are closely spaced whereby extreme accuracy in following the center line of the row of cotton may be attained. For example, the cotton picking machine must follow a row of cotton quite precisely in order to maintain the toes 46 in straddling relationship with the center line of the row of cotton.

Each of the shields 22 is provided with a gently curved and sloping riser portion 54 which continues upwardly from each inclined portion 52, as hereinbefore described. Each riser portion fairs into a vertically extended portion 56 which may be substantially semicircular in cross section, as shown in FIG. 3 of the drawings. Each portion 56 is provided with inner surfaces 58. Each inner surface 58 of each shield 22 being spaced adjacent to the other and disposed to operate at one side of a row of cotton plants in order to provide for guidance of the limbs and cotton bolls into the cotton picking machine. It will be appreciated that the gradual curvature of the features of the shield from the toe portion 52 to the arcuate in cross section curved portions 56 creates a minimum of mechanical disturbance of the cotton plants and thereby causes a minimum loss of cotton bolls during the passage of the cotton picking machine along and over the rows of these plants.

The toe portions 46, at their lower edges, are provided with rearwardly extending skirt edge portions 47 which are substantially straight and parallel to a row of cotton, as shown in FIGS. 2 and 3 of the drawings. These skirt edge portions 47 of adjacent toes 46, are spaced apart so that each skirt portion 47 is spaced from a cotton row center line. This spacing substantially equals the spacing of the sides J and K, of the bearing shoe 16, or the machine frame, from the center line of a row of cotton being picked.

It will be understood that the construction of conventional cotton picking machines vary and that the bearing shoes 16 must be spaced to straddle a row of cotton or an equivalent lower frame structure must be spaced apart to straddle the row of cotton.

It will be appreciated that the skirt edge portions 47 are disposed closer together than the curved portions 56 whereby the skirt edge portions run close to the cotton plants adjacent the ground while the more widely spaced curved portions are spaced apart to substantially equal the mouth width of a cotton picking machine and to thereby receive the diverging limbs of cotton plants without unduly agitating them.

Each shield 22 is provided with a second forwardly projecting toe 60 having geometry similar to the toe 46, hereinbefore described. Each toe 60 is disposed to operate near adjacent rows of cotton, as indicated by lines F and G in FIG. 3 of the drawings. When the toes 46 and 60 are running adjacent respective rows of cotton, a space 59 between these toes permits trash to pass under the shields 22 and to be deposited in a medial location between adjacent rows of cotton. The space 59, above the middle of the furrow between rows of cotton, allows trash to pass under each shield 22 during movement of the respective cotton picking machine. Furthermore, limbs of cotton plants lying on the ground toward the oncoming machine may be raised by the lifters 48 and toes 46 upward in the space 59 before the middle portions of the shields pass over these limbs.

In the event the frontal means for cotton picking machines of the invention is used in connection with multiple row picking machines, the toes 60 may be provided with lifters 48, as shown in FIG. 3, whereby the toes 60 may function adjacent to a row of cotton in a similar fashion to the toes 52, hereinbefore described.

It will be further noted that at least one of the shields 20 may each carry two blades 24. As for example, the blades 24, shown in FIG. 3, are carried rearwardly of the toes 60 in the event they are disposed to be operated in connection with a multiple row cotton picking machine.

Each shield 20 is provided with a supporting frame which comprises braces 62 and 64 which converge upwardly and backwardly to a common connection 66 which is bolted to the cotton picking machine 10 by a bolt 68. The lower portions of the shields 22 are bridged from side to side by a channel member 70 which is secured by bolts 72 to a plate 74 stationarily connected to the frame of the machine 10 by a bracket 76. Each plate 74 is provided with openings through which the bolts 72 extend and is also provided with lower openings 78 which are adapted to receive the bolts 72 for lowering the shields 22, as will be hereinafter described.

The operation of the frontal means for cotton picking machines when coupled to a conventional cotton picking machine is substantially as follows:

The bearing shoes 16 and bars 12 may be raised and lowered by conventional mechanism of the machine 10 and this last mentioned means also raises and lowers the shields 22 and all the connected frontal means for cotton picking machines in accordance with the invention.

When the cotton picking machine 10 is proceeding longitudinally of a row of cotton A, as shown in FIGS. 1 and 2 of the drawings, the lifters 48 are disposed sufficiently far forward of the machine so that the operator may readily see these lifters as they are projected into the ground so that the lower skirt portions 80 of each shield 22 run substantially on a level with the upper surface B of the soil. This control of elevation places the blades 24 at a desired level so that their lower edges 26 trowel or move the dirt away as previously described in connection with FIG. 2 of the drawings, in order to permit the bearing shoes 16 to follow in the recesses D, as shown in FIG. 2, so that the spindles 14 may pick cotton in the proximity of the upper surface B of the soil, as disclosed in FIG. 2 of the drawings. The skirt edges 80 of the shields 22 are preferably made of rod or pipe or may be of rolled sheet metal so that they form a smooth edge around which the stocks and limbs of the cotton plants are forced to pass between the shields and into the cotton picking machine in alignment with the spaces between the bars 12 and spindles 14.

During the harvesting of cotton, it is customary to pick the cotton more than once in accordance with its maturity. As for example, a cotton picking machine is first passed through a field of cotton when the early cotton bolls open and at some later time, the machine is again passed through the field to pick cotton which is developed by the opening of bolls subsequent to the first picking.

It will be appreciated that upon the first picking, the blades 24 will form the recesses D, as shown in FIG. 2 of the drawings, so that the bearing shoes 16 may run therein.

During subsequent picking operations, it has been found advisable to remove the blades 24 and move the skirt portions 80 of the shields down to a level H, as shown in FIG. 5 of the drawings, which coincide substantially with the levels D, as shown in FIG. 2 of the drawings.

To accomplish this, the shields 22 are moved downwardly by removing the bolts 68 and 72 and placing the bolts 68 in a hole at a lower location on the machine while the bolts 72, together with the channel 70 are moved down so that the bolts 72 may be placed in the holes 78 of the brackets 74, shown in FIG. 6 of the drawings. Thus, the skirt portions 80 of the shields 20 may run at a level corresponding with the lower surfaces 18 of the bearing shoes 16 subsequent to the first picking. This is necessary in order to permit the lifters 48 to run beneath the surface of the ground which has been trowled down to the levels D, as shown in FIG. 2 of the drawings, and also to give the operator visual control of the elevation of the frontal means for cotton picking machines in accordance with the invention.

It will be appreciated by those skilled in the art that the close spacing of the toes 46 of the shields 20 and the precise elevation control afforded by the lifters 48 running in the soil permits the operator at all times accurately to place the spindles 14 at or near the upper surface B of the soil so that a maximum percentage of the cotton is gathered while other features of the shields, as hereinbefore described, cause a minimum disturbance of the cotton plants and therefore gather a maximum percentage of the cotton. Furthermore, the troweling action of the blades 24 removes trash and foreign matter from the area of the spindles so that this trash and foreign matter is not collected in the cotton.

As shown in FIG. 9 of the drawings, a blade 90 may be substituted for the blade 24, shown in FIG. 8 of the drawings. This blade 90 is provided with a cutting disc 91, at its leading edge rotatably mounted thereon, by means of an axle pin 82. Clips 94 and 96 are provided with openings 98 and 100 to receive bolts similar to the bolts 28 and 30, shown in FIG. 8 of the drawings, for securing the blade 90 to the plate 32. The disc 91 provides for cutting action on sod or grass and other materials to be parted and removed from the areas D, shown in FIG. 2 of the drawings.

It will be obvious to those skilled in the art that various modifications of the present invention may be resorted to in a manner limited only by a just interpretation of the following claims.

I claim:
1. In a frontal means for cotton picking machines the combination with a cotton picking machine having vertically disposed bars provided with cotton picking spindles extending radially therefrom and first means supporting the normally lower ends of said bars below said spindles; the invention comprising: second means operably disposed forwardly of said spindles and said first means and disposed to remove soil at opposite sides of a row of cotton plants to lower the elevation of soil, whereby said bearing means may follow said second means at a level, below the normal soil level existing during the growth of said plants, to support said spindles in close proximity to the upper surface of the ground to thereby gather cotton all the way down to and including that lying on the upper surface of the ground.

2. In a frontal means for cotton picking machines the combination with a cotton picking machine having vertically disposed bars provided with cotton picking spindles extending radially therefrom and first means supporting the normally lower ends of said bars below said spindles; the invention comprising: second means operably disposed forwardly of said spindles and said first means and disposed to remove soil at opposite sides of a row of cotton plants to lower the elevation of soil, whereby said bearing means may follow said second means at a level, below the normal soil level existing during the growth of said plants, to support said spindles in close proximity to the upper surface of the ground to thereby gather cotton all the way down to and including that lying on the upper surface of the ground; and third means operable at the upper surface of the soil serving as a reference to control the vertical operating depth of said first means relative to the upper surface of the soil serving as a reference.

3. In a frontal means for cotton picking machines the combination with a cotton picking machine having vertically disposed bars provided with cotton picking spindles extending radially therefrom and first means supporting the normally lower ends of said bars below said spindles; the invention comprising: second means operably disposed forwardly of said spindles and said first means and disposed to remove soil at opposite sides of a row of cotton plants to lower the elevation of soil, whereby said bearing means may follow said second means at a level, below the normal soil level existing during the growth of said plants, to support said spindles in close proximity to the upper surface of the ground to thereby gather cotton all the way down to and including that lying on the upper surface of the ground; and shield means projecting forwardly of said first means and having toe portions visible by the operator of said machine and controllable to run at the upper surface of the ground.

4. In a frontal means for cotton picking machines the combination with a cotton picking machine having vertically disposed bars provided with cotton picking spindles extending radially therefrom and first means supporting the normally lower ends of said bars below said spindles; the invention comprising: second means operably disposed forwardly of said spindles and said first means and disposed to remove soil at opposite sides of a row of cotton plants to lower the elevation of soil, whereby said bearing means may follow said second means at a level, below the normal soil level existing during the growth of said plants, to support said spindles in close proximity to the upper surface of the ground to thereby gather cotton all the way down to and including that lying on the upper surface of the ground; shield means projecting forwardly of said first means and having toe portions controllable to run at the upper surface of the ground; and lifter means projecting forwardly and downwardly from said toe portions, said lifter means having a forward end disposed to run in the ground to pick up and lift cotton plant branches onto said toe portions.

5. In a frontal means for cotton picking machines the combination with a cotton picking machine having vertically disposed bars provided with cotton picking spindles extending radially therefrom and first means supporting the normally lower ends of said bars below said spindles; the invention comprising: second means operably disposed forwardly of said spindles and said first means and disposed to remove soil at opposite sides of a row of cotton plants to lower the elevation of soil, whereby said bearing means may follow said second means at a level, below the normal soil level existing during the growth of said plants, to support said spindles in close proximity to the upper surface of the ground to thereby gather cotton all the way down to and including that lying on the upper surface of the ground; and shield means projecting forwardly of said first means and having toe portions controllable to run at the upper surface of the ground, said toe portions inclined upwardly and laterally at the sides thereof operable adjacent a row of cotton being picked.

6. In a frontal means for cotton picking machines the combination with a cotton picking machine having vertically disposed bars provided with cotton picking spindles extending radially therefrom and first means supporting the normally lower ends of said bars below said spindles; the invention comprising: second means operably disposed forwardly of said spindles and said first means and disposed to remove soil at opposite sides of a row of cotton plants to lower the elevation of said soil, whereby said first means may follow said second means at a level, below the normal soil level existing during the growth of said plants to support said spindles in close proximity to the upper surface of the ground to thereby gather cotton all the way down to and including that lying on the upper surface of the ground; shield means projecting forwardly of said second means and having toe portions controllable to run at the upper surface of the ground, said toe portions inclined upwardly and laterally at the sides thereof operable adjacent a row of cotton being picked; and portions of said shields extending in continuity with the inclined toe portions to an elevation at which the shields convergingly guide upper portions of cotton plants therebetween and into an area in which said spindles operate.

7. In a frontal means for cotton picking machines the combination with a cotton picking machine having vertically disposed bars provided with cotton picking spindles extending radially therefrom and first means supporting the normally lower ends of said bars below said spindles; the invention comprising: second means operably disposed forwardly of said spindles and said first means and disposed to remove soil at opposite sides of a row of cotton plants to lower the elevation of said soil, whereby said first means may follow said second means at a level, below the normal soil level existing during the growth of said plants to support said spindles in close proximity to the upper surface of the ground to thereby gather cotton all the way down to and including that lying on the upper surface of the ground; and shield means projecting forwardly of said second means and having toe portions controllable to run at the upper surface of the ground, said second means removably secured to the lower portions of said shield means.

References Cited in the file of this patent
UNITED STATES PATENTS

| | | |
|---|---|---|
| 535,710 | Maxwell | Mar. 12, 1895 |
| 906,811 | Main | Dec. 15, 1908 |
| 1,185,111 | Lee | May 30, 1916 |
| 2,926,338 | Johnston | Sept. 12, 1933 |
| 2,247,687 | Johnston | July 1, 1941 |
| 2,514,898 | Ramsey | July 11, 1950 |
| 2,660,015 | Briscoe | Nov. 24, 1953 |
| 2,674,075 | Snow | Apr. 6, 1954 |
| 2,700,857 | Stearman | Feb. 1, 1955 |